United States Patent [19]

Brinegar

[11] Patent Number: 4,914,939
[45] Date of Patent: Apr. 10, 1990

[54] SELF PROPELLED INTERNAL PIPE ARCHING APPARATUS

[75] Inventor: O'Dell Brinegar, Middletown, Ohio

[73] Assignee: Contech Construction Products, Inc., Middletown, Ohio

[21] Appl. No.: 201,753

[22] Filed: Jun. 3, 1988

[51] Int. Cl.[4] .............................................. B21D 39/20
[52] U.S. Cl. ........................................ 72/392; 72/446
[58] Field of Search ........................... 72/392, 393, 446

[56] References Cited

U.S. PATENT DOCUMENTS

| | | |
|---|---|---|
| 2,474,887 | 7/1949 | Carswell et al. . |
| 2,623,570 | 12/1952 | Resser ........................ 72/393 |
| 2,814,326 | 11/1957 | Washabaugh .................. 72/392 |
| 2,846,102 | 8/1958 | Connor . |
| 2,916,076 | 12/1959 | Young . |
| 3,266,285 | 8/1966 | Jensen ........................ 72/393 |
| 3,392,858 | 7/1968 | Fernstrom et al. . |
| 3,747,394 | 7/1973 | Cunningham . |
| 3,996,783 | 12/1976 | Meserole . |
| 4,004,444 | 1/1977 | Pollart . |
| 4,005,793 | 2/1977 | Smith . |
| 4,270,379 | 6/1981 | Van Gompel . |
| 4,279,567 | 7/1981 | Thompson . |
| 4,289,442 | 9/1981 | Stevens . |

Primary Examiner—Lowell A. Larson
Attorney, Agent, or Firm—Wood, Herron & Evans

[57] ABSTRACT

An internal pipe arching apparatus has a self propelled unit for ground supporting an elongated longitudinal beam along its length. The unit is adapted to drive the beam into a pipe along its axis and lift the beam to a pipe arching position. The beam has an internal pipe arching means mounted thereto for forcible arching of a pipe when said beam is in the arching position. The mobile unit provides means for transporting and controlling the pipe expansion means.

6 Claims, 6 Drawing Sheets

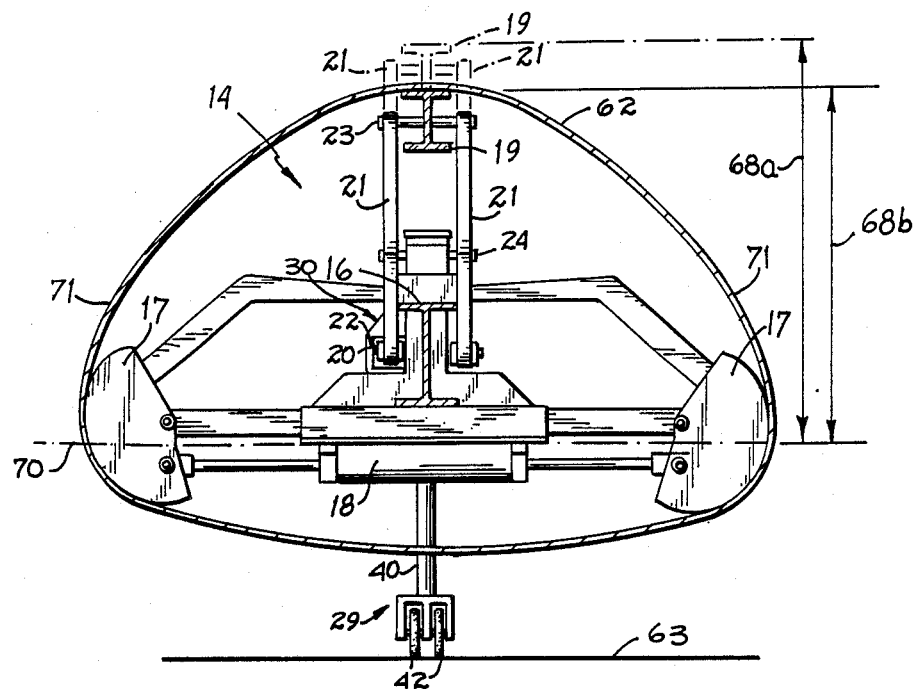
FIG. 10
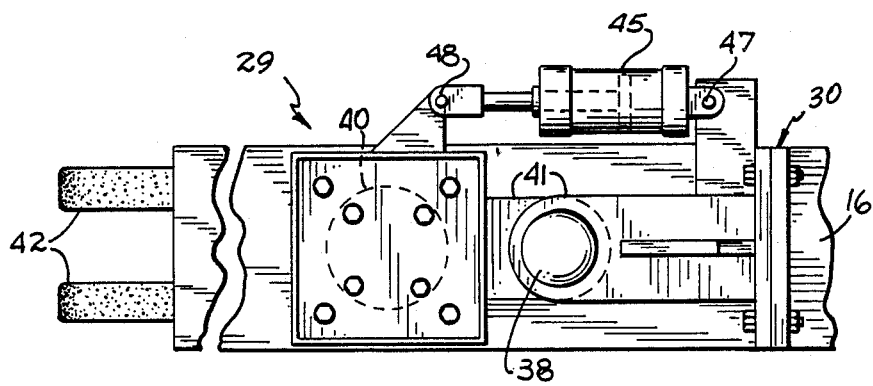
FIG. 3

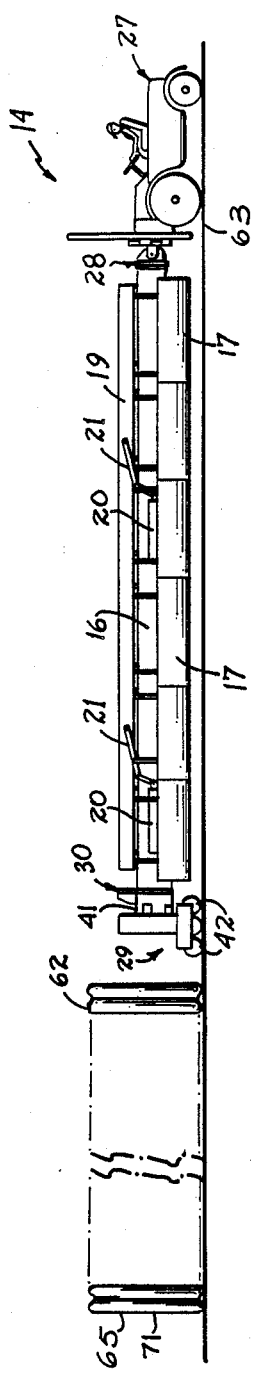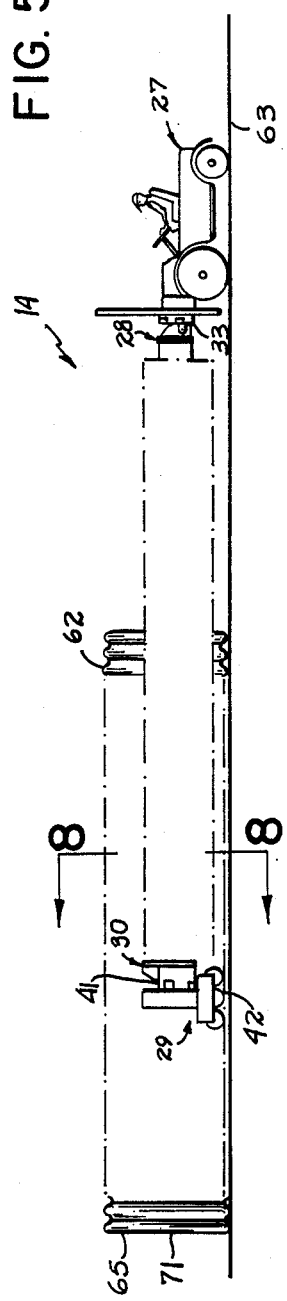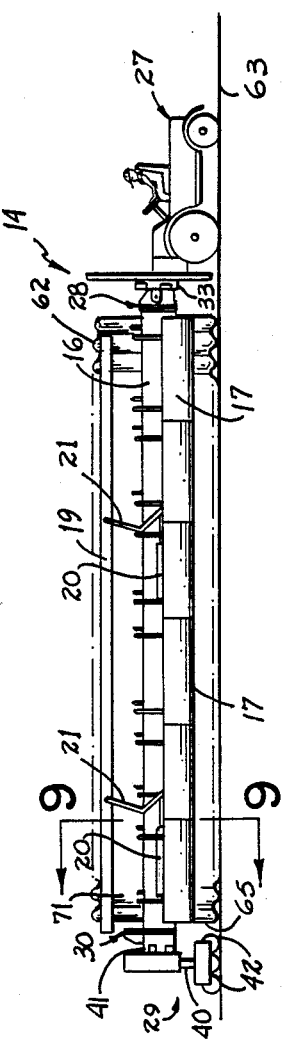

SELF PROPELLED INTERNAL PIPE ARCHING APPARATUS

FIELD OF THE INVENTION

The present invention relates to pipe arching apparatus, and more particularly to a self propelled internal pipe arching apparatus for arching corrugated steel pipe.

BACKGROUND OF THE INVENTION

Corrugated steel pipe sections can be used to form pipeline drainage systems along or beneath highways, or for various other construction projects where diversion of water flow or drainage of runoff is required. Depending upon the size and nature of the project, the dimensions of the corrugated steel pipe that are used to form the drainage system may vary. Steel corrugated pipe sections of this type range in diameter from 24" to 144", are made in lengths of up to 24', and have a thickness of 0.064"–16 gauge up to 0.168', or 8 gauge. Typical weights for such pipe sections are given in pounds/foot of length. For example, a 144" diameter pipe has a weight of 400 pounds/foot.

Full-round pipe is suitable for most typical applications. However, sometimes it is beneficial to use a pipe arch, which is round pipe that has been forcibly widened at the bottom The low, wide pipearch design redistributes the runoff area horizontally to provide adequate drainage capacity without necessitating a lowering of the grade, as would otherwise be required with a round pipe. In some cases, use of pipe arch can reduce fill work and grading by as much as one-fourth. The pipe-arch design also is valuable where fast, unrestricted runoff is required. It functions more effectively at low water levels than round pipe.

When a section of pipe is arched, the widest horizontal span of the arched pipe becomes greater than the original diameter, while the height is reduced. For example, an arched pipe section which had an original diameter of 144" will have a horizontal span of about 178" at its widest point. Similarly, an arched pipe having an original diameter of 120" will have a horizontal span of about 137". For pipe sections having an original diameter of 120" or greater, the arched section will have a horizontal span which is sufficiently great so as to require that it be designated as a "wide load" when transported via highway routes to the job site. Generally, transportation of a wide load requires accompaniment by leading and trailing escort vehicles, along with other safety precautions, such as notification banners and the like, all of which drive up the cost of shipping.

Prior pipe arches have been formed in the factory, either by an external pipe arching machine or by an internal pipe arching machine. To affect external pipe arching, force is applied directly to the external surface of the pipe to compress it until a desired shape is obtained Such an external pipe arching apparatus is disclosed in U.S. Pat. No. 2,286,197. Although pipe arched by an external pipe arching apparatus is suitable for some applications, a more uniform arch can be obtained by using an internal pipe arching machine.

A typical internal pipe arching apparatus utilizes a cantilevered horizontal beam rigidly secured at a fixed end, with longitudinally extending forming segments mounted upon opposite sides of the beam. The beam is about 25 feet long. The forming segments are extendable in opposite directions in a horizontal plane to forcibly deform the internal side walls of a pipe section that is suspended on the beam. In order to accommodate different sizes of pipe, the forming segments are made in different sizes and are removably mounted to the opposite sides of the horizontal beam. During arching, the pipe section is suspended in order to allow the top and bottom surfaces to flatten as the sides are elongated. The horizontal beam is mounted a sufficient distance above the floor to enable various sizes of pipe to be moved over the beam prior to arching, and withdrawn from the beam after arching. This movement must be performed via an overhead crane, or some other type of lifting device.

The beam and the mounted forming segments have a total weight of about 40,000 pounds. Additionally, a pipe section on the machine may have a weight of as much as 400 lbs/ft at lengths of up to 24 feet. Due to the cumulative effect of supporting this combined weight over a period of time, at a fixed end of the beam, the horizontal beam will eventually bow in a downward direction. Because the forming segments are mounted longitudinally alongside the beam, downward bowing of the beam affects the path of extension of the forming segments during arching, thus resulting in a pipe that is not uniformly arched along its length. After a certain amount of bowing, the beam cannot be used anymore.

In the past, to minimize the effects of bowing, the horizontal beam has been be bowed slightly upwardly during manufacture, thereby compensating for some of the bending that will eventually occur. However, this is only a temporary solution, and an unsuitable one at that. Depending upon the height of the horizontal beam above the floor, and the diameter of the pipe to be arched, it is sometimes necessary to also raise the horizontal beam and forming segments with respect to the floor in order to suspend the pipe in the air. Thus, the fixed end of the horizontal beam must not only be able to support the total weight of the structure, it also must be mounted for vertical movement.

To reduce the combined moment of inertia that is created at the fixed end of the beam during vertical raising, a hydraulic jack can be attached at the free end of the beam to provide additional, liftable support, enabling the beam to be lifted at both ends. However, the jack must be disconnected from the beam in order to move a section of pipe over the free end of the beam before arching and reconnected once the pipe section is in place, thus requiring additional steps in order to affect pipe arching. Moreover, although the useful life of the beam may be extended somewhat by providing support at both ends, it is still required that the fixed end of the beam be able to support the total weight of the beam, the forming segments and the suspended pipe during those times when the jack is not connected.

The following is a list of patents as background to this invention, and no representation is made that they are pertinent or relevant prior art: U.S. Pat. Nos. 2,474,887; 2,846,102; 2,916,076; 3,392,858; 3,747,394; 3,996,783; 4,004,444; 4,005,793; 4,270,379; 4,279,567; and 4,289,442.

SUMMARY OF THE INVENTION

In a preferred embodiment of the present invention, an internal pipe arching machine comprises a self propelled unit for ground supporting an elongated longitudinal beam along its length. The unit is adapted to drive the beam into a pipe along its axis and locate the beam into a pipe arching position. Pipe expansion means, or forming segments, mounted to the beam are adapted to forcibly arch the pipe when the beam is in the arching position. The self-propelled unit provides means for transporting and controlling the pipe expansion means, thus enabling pipe to be arched either in the factory or at the job site.

In one preferred embodiment of the machine, a first wheeled drive means is operatively connected to one end of the pipe expansion beam with a second wheeled means at its opposite end to provide self propelled mobility. A truck can function as the drive means at one beam end with a steering wheel assembly mounted on the opposite beam end, thus enabling the self propelled machine to be steered toward and drivably extended through a pipe to be arched. In addition to the controls for the beam mounted pipe expansion means, controls for steering, transporting and locating the beam are also preferably located at the truck.

The self propelled internal pipe arching machine saves labor, time and costs associated with past devices for physically moving a pipe over the fixed horizontal beam prior to arching, and then removing the arched pipe from the beam after arching has occurred. Moreover, the elongated beam carrying the forming segments is supported along its length with the machine of this invention with means for lifting at both ends. Thus, the occurrence of beam bowing is reduced or eliminated in comparison to prior devices and the need to prop the beam with a jack is also alleviated.

The self propelled internal pipe arching apparatus of this invention enables arching to take place in the field. Thus, significant reductions in shipping costs can be realized, especially for some large dimensions of pipe as developed in the above background of this invention. Pipes can be taken to the field without requiring transportation as a wide load and then simply arched on site. Other advantages and features of the invention will become apparent upon reading the following detailed description and upon reference to the drawings, in which:

BRIEF DESCRIPTION OF THE DRAWINGS

FIG. 3 is a top view taken along lines 3—3 of FIG. 2;

FIG. 5 is a diagrammatic view showing a preferred embodiment of the self propelled internal pipe arching machine as it approaches a section of steel corrugated pipe to be arched, prior to arching;

FIG. 6 is a diagrammatic view showing a preferred embodiment of the self propelled internal pipe arching machine of this invention as it is drivably extended into a section of steel corrugated pipe to be arched;

FIG. 7 is a diagrammatic view showing the self propelled internal pipe arching apparatus of this invention completely extended through a section of pipe to be arched;

FIG. 10 is a cross-sectional view similar to FIG. 9, but showing the forming segments further extended to deform a section of corrugated pipe.

DETAILED DESCRIPTION OF THE DRAWINGS

Figure 1:
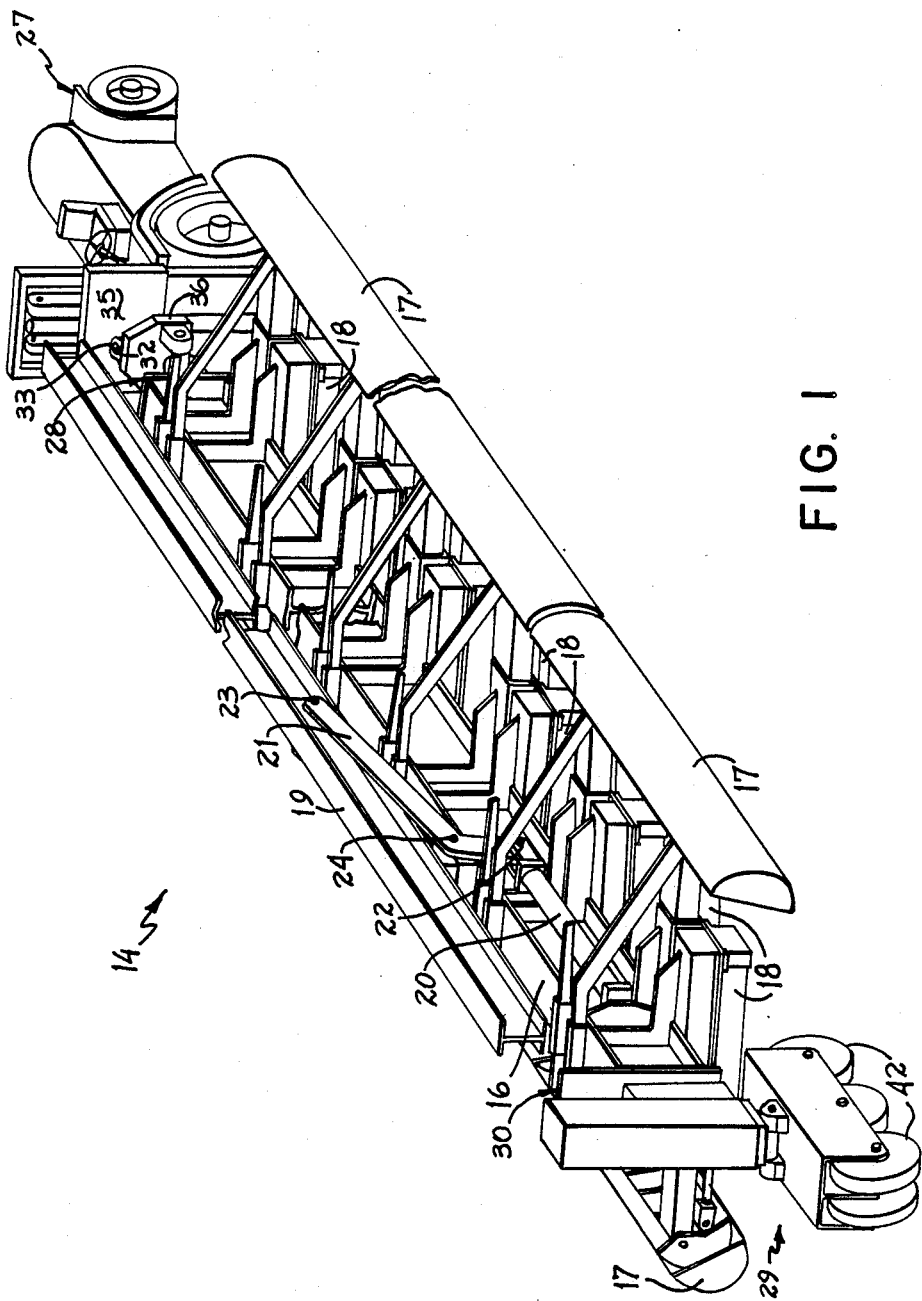
FIG. 1 is an isometric view, partially broken away, of a preferred embodiment of the self propelled internal pipe arching machine of this invention.

FIGS. 1 through 10 depict a preferred embodiment of the self propelled internal pipe arching machine 14 of this invention. As seen in FIG. 1, a self propelled pipe arching machine comprises an elongated, longitudinal beam 16 having forming segments 17 mounted on opposite sides thereof, the beam 16 is ground supported along its length by a self propelled unit. The beam 16 is about twenty-five feet long and, along with the forming segments 17, weighs about 40,000 lbs. The forming segments 17 are horizontally extendable from the beam 16 in a substantially horizontal plane in order to contact and forcibly arch the inner side walls of a pipe suspended on the beam 16. To extend the segments 17, a plurality of hydraulic cylinders 18 are mounted along the bottom of the beam 16.

A lift segment 19 is mounted to the top of the beam 16 to locate the beam 16 in a pipe arching position. Preferably, locating is done by raising the lift segment 19 by hydraulic cylinders 20 to a predetermined vertical distance above the beam 16. This raising of the lift segment 19 with respect to the beam 16 aligns the forming segments 17 for extension in the desired horizontal plane. Raising is accomplished by bellcrank lever arms 21, which connect the cylinder 20 to the lifting segment 19 at rotatable points 22 and 23, and are mounted for pivotal movement about pivot points 24.

When pipe arch is required, the arched pipe sections must meet specific dimensional requirements. The horizontal span at the widest point is specified, along with the required height of the arched pipe, and the vertical distance from the bottom of the arched pipe section to the horizontal plane of widest horizontal dimension. This latter vertical dimension is referred to as the spring line distance, or the B dimension.

In order to obtain an arched pipe section having the required spring line distance and the required height, the forming segments must be extended in a substantially horizontal plane which is a predetermined vertical distance from the top inside surface of the pipe. This is accomplished by vertically raising the suspended pipe section with respect to the beam via the lift segment 19 that is mounted to the top of the horizontal beam 16. The top of the lift segment 19 supports the internal top wall of the pipe at the predetermined distance above the horizontal plane extension of the forming segments. This predetermined distance will be greater than the final vertical distance between the top of the pipe and the widest horizontal span, due to the flattening out at the top of the pipe as the sides are elongated horizontally.

During initial arching, the lift segment 19 braces the top of the pipe to restrict flattening, while unrestricted flattening occurs at the bottom. Once the forming segments have contacted the side walls of the pipe and the load has been transferred from the lift segment, the lift segment can be lowered to a level known to correspond to the final position of the top of the arched pipe. At this point in the arching process, the top will undergo some flattening as the forming segments continue to extend. For one typical application, a pipe having an original diameter of 72", and a horizontal span of 85" after arching, will also have a final height of 54" and a B dimension of 20". To support a pipe of these dimensions, the final distance between the top of the lift segment and the widest horizontal span should be 34 (by subtracting the B dimension, 20", from the final height, 54"). However, it is known from experience that prior to arching, the predetermined distance between the top of the lift segment and the radial extension plane should be about 39" or 40". Thus, once forming segments have contacted the internal sides of the pipe and the load has shifted from the top of the lift segment to the forming segments, the lift segment should be lowered about 5' or 6' to accommodate flattening of the top of the pipe.

The predetermined vertical distance between the top of the lift segment and the radial extension plane will vary with different sizes of pipe. The larger the diameter of the pipe, the greater the predetermined vertical distance, and the greater the distance that the lifting segment must be lowered after load shift in order to allow flattening of the top of the pipe section. For some larger sizes of pipe, in order to achieve a sufficient predetermined vertical distance between the top of the lift segment and the plane of radial extension prior to arching, additional lift segments must be stacked on top of the raisably mounted lift segment.

Figure 2:
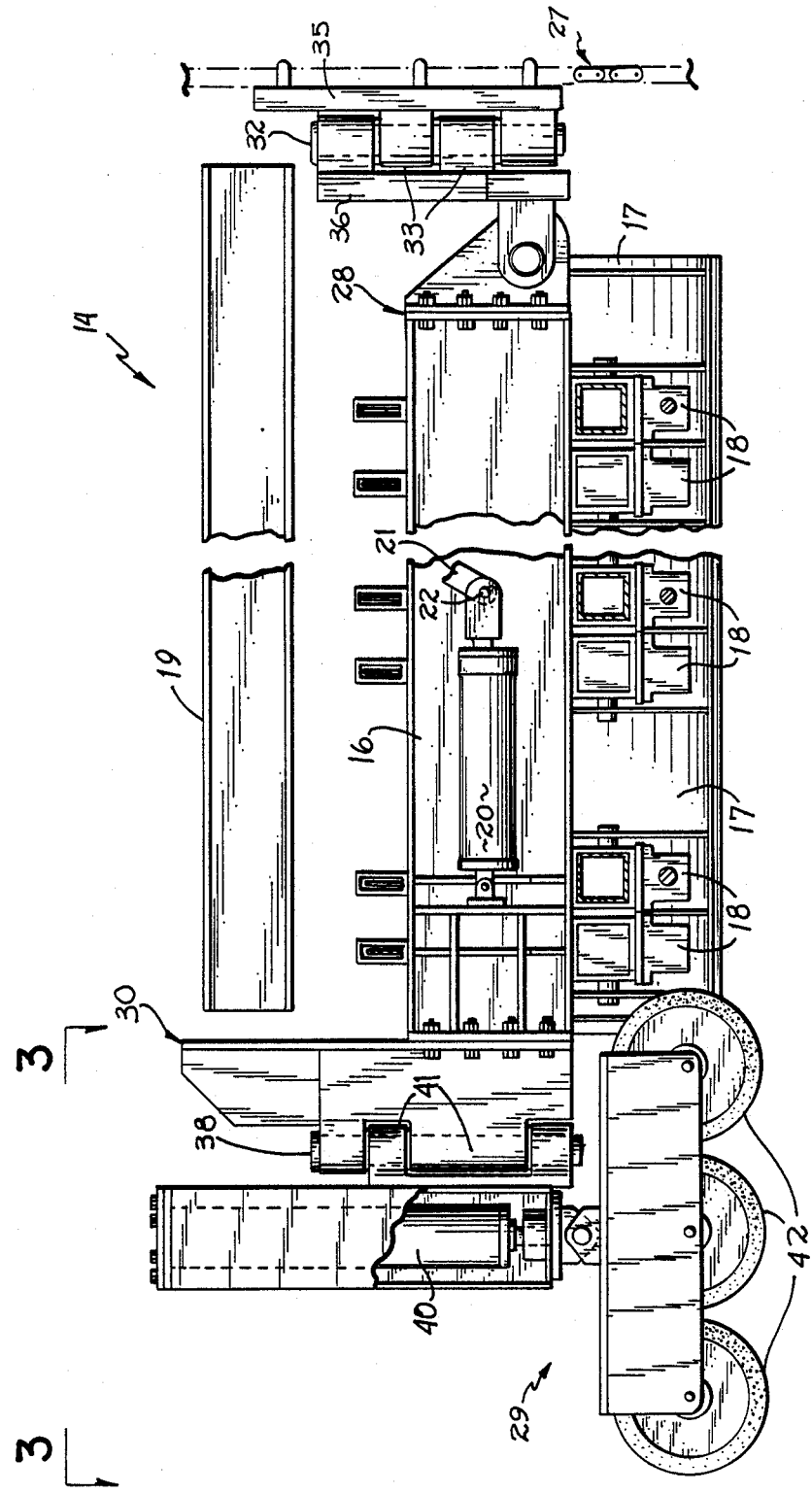
FIG. 2 is a side view, partially broken away, of a preferred embodiment of the self propelled internal pipe arching apparatus of this invention.

The self-propelled mobile unit provides direct, or ground support along the length of the beam 16 to enable drivable extension or withdrawal from a pipe, either in the field or in the factory. Preferably, the self propelled unit comprises a first wheeled driver means, or a lift truck 27, removably connected to a first end 28 of the beam 16 and a second wheeled means, or a nose wheel assembly 29, connected to a second end 30 of the beam 16. As shown in FIG. 2, the first end 28 of the beam 16 is coupled to the lift truck 27 by a removable pin 32 which extends vertically through aligned sockets 33 projecting from a vertically raisable support plate 35 of the lift truck 27 and a backing plate 36 connected to the beam 16. The connection of the lift truck 27 and the first end 28 of the beam allow some pivotal play about the vertical axis of pin 32.

Similarly, the nose wheel assembly 29 and the second end 30 of the beam 16 are coupled by a pin 38 which extends through vertically aligned sockets 41. A hydraulic cylinder 40 within the nose wheel assembly 29 enables the second end 30 to be vertically raised, in cooperation with raising of the vertical support plate 35 of the lift truck 27.

Although one wheel would be adequate for some pipe arching applications, the nose wheel assembly 29 preferably has a plurality of wheels, thereby providing better weight distribution to insure against deformation of the corrugations in the pipe as the beam 16 is drivably extended therethrough. For other arching applications, particularly those involving sections of pipe of relatively smaller diameter, a single wheel having a size large enough to support the required load would probably not fit through the pipe.

As shown in FIG. 3, the nose wheel assembly 29 is connected to second end 30 so as to permit pivotal motion about a vertical axis aligned with vertical connection pin 38. Pivotal motion is powered by a hydraulic cylinder 45 fixed to second end 30 at point 47 and hingedly connected to nose wheel assembly 29 at point 48.

A diesel powered hydraulic power unit 50 (FIG. 4) is mounted on the lift truck 27. The unit 50 has a capacity rating of 80 gallons per minute at 1500 pounds per square inch. Control valves 51–55, are operatively associated with the steering cylinder 45, the nose wheel assembly lifting cylinder 40, lift segment raising cylinders 20 and pipe arching cylinders 18, respectively. The control valves are hand operated, three position, 4-way with closed center, and mounted on a common manifold block 57 at the lift truck 27. A lift truck operator can thus control all hydraulic functions from the lift truck 27. The control valves 51 and 52 are connected with steering cylinder 45 and nose lift cylinder 40, respectively, via hydraulic lines 59 and 60 which extend along the bottom of beam 16.

Figure 4:
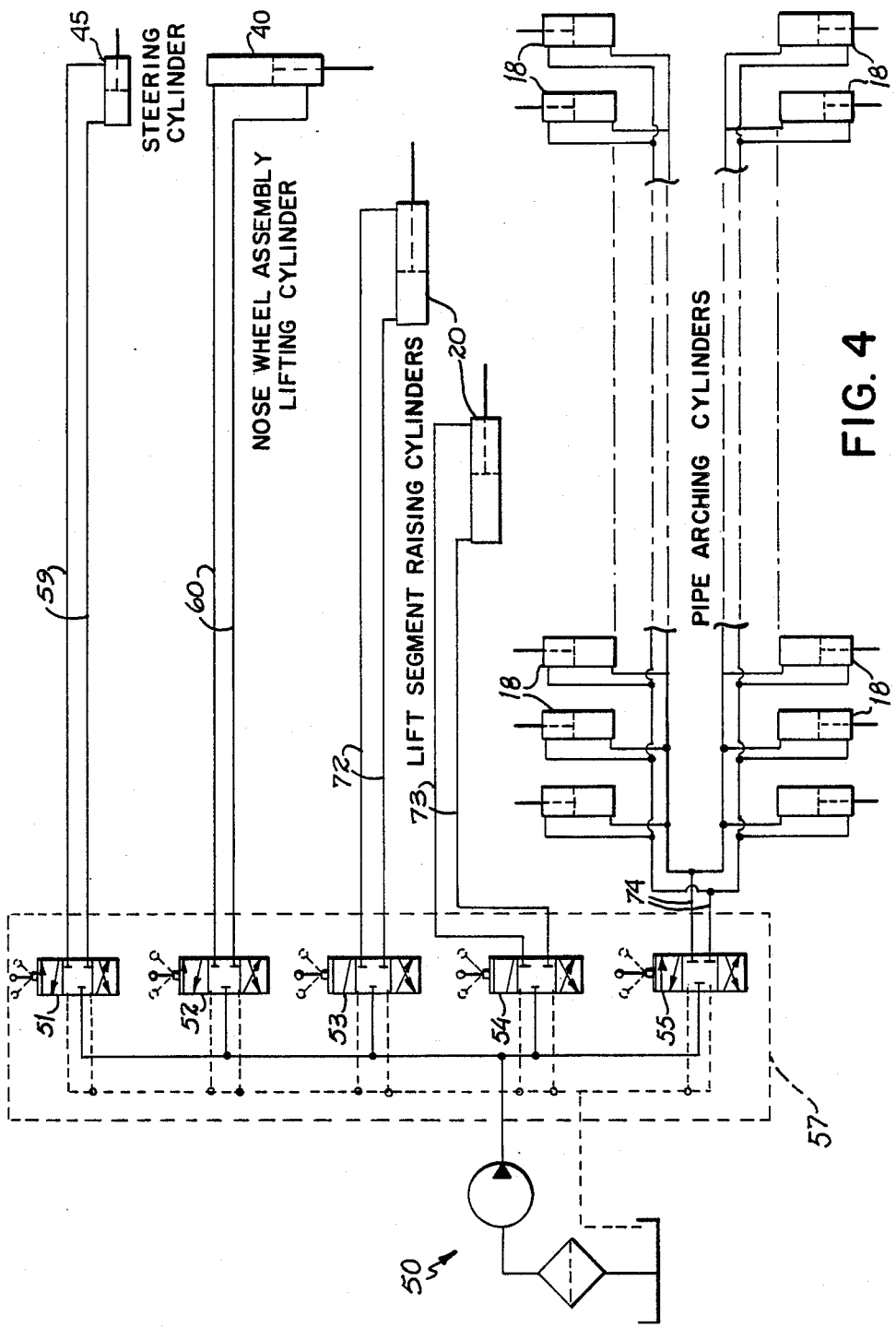
FIG. 4 is a schematic view showing the hydraulic controls for a preferred embodiment of the self propelled pipe arching machine of this invention.
Figure 8:
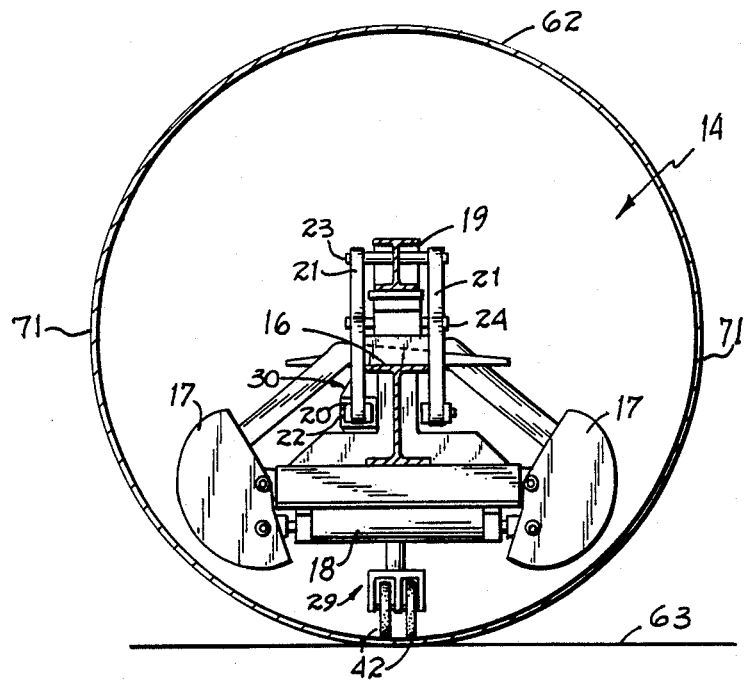
FIG. 8 is a cross-sectional view taken along lines 8—8 of FIG. 6.
Figure 9:
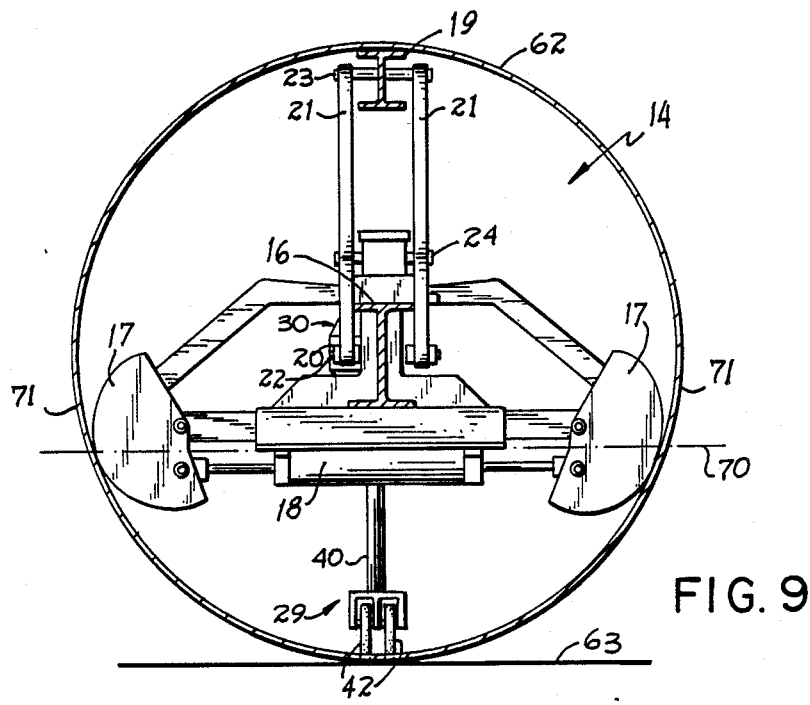
FIG. 9 is a cross-sectional view taken along lines 9—9 of FIG. 7.

To affect internal pipe arching, the self propelled internal pipe arching machine 14 is drivably extended through a pipe section 62 resting on the ground 63, as shown in FIGS. 5 and 6. When completely projected therethrough, as shown in FIG. 7, the wheels 42 of the nose wheel assembly 29 contact the ground 63 beyond an end portion 65 of the pipe 62. In order to forcibly arch the pipe 62 along the desired horizontal plane, the lift segment 19 is raised above the beam 16 to a predetermined vertical distance 68a (FIG. 10), which is known to correspond to the final, desired arched dimensions. As shown in FIG. 4, raising is accomplished by operation of a control valve 53 which is located at the lift truck 27, and connected to raising cylinder 70 via hydraulic lines 72 and 73. For some larger dimensions of pipe, additional beams must be stacked on top of lift segment 19 in order to achieve the necessary predetermined vertical distance. Depending upon the diameter of the pipe, and the relative height of the beam 16 above the ground 63, this may or may not suspend the pipe 62 in the air.

Either before, after, or during raising of lift segment 19, the first 28 and second 30 ends of the beam 16 are raised to insure suspension of the pipe section 62 in the air. Preferably, the lifting of first and second ends 28 and 30 is done cooperatively. This can be accomplished at the lift truck 27 by simultaneously raising the support plate 35 and maneuvering control valve 52. As mentioned previously, the pipe 62 is suspended during arching so that flattening at the top and bottom of the pipe 62 can occur as the sides of the pipe are horizontally elongated during arching.

Once raised, the forming segments 17 are extended in opposite directions in the desired horizontal plane 70 to contact the side walls 71 of the pipe 62. Extension is controlled by operation of valve 55 at the lift truck 27. Valve 55 is connected to pipe arching cylinders 18 via hydraulic lines 74. Initially, lift segment 19 braces the top of the pipe 62 from flattening. As the forming segments 17 elongate the pipe 62 horizontally, the load eventually shifts from the top of the lift segment 19 to the forming segments 17. After the load has shifted, the lift segment 19 is vertically lowered to a final vertical distance 68b above plane 70 in order to permit flattening or downward deformation of the top of the pipe 62.

After arching has taken place, the forming segments 17 are retracted to their original position, thus gradually lowering the pipe 62 until it contacts the lift segment 19. If not already resting on the ground 63, the first and second ends of the beam 16 are lowered until the pipe section 62 is resting upon the ground. The mobile pipe arching machine 14 is then drivably withdrawn from the arched section, and subsequently drivably extended into another section to be arched.

With the self propelled internal pipe arching machine 14 of this invention, a number of pipe sections can be successively arched without having to separately move every pipe section onto the beam before arching and off of the beam after arching. This reduces the time required to arch a plurality of pipe sections. In addition to providing mobility, constant support of both the first and second ends of the beam 16 significantly reduces the weight that would otherwise have to be supported at one end. Moreover, by providing permanently connected means for lifting the second end of the beam, a variation in the height of the beam 16 above the ground 63 is easily accomplished without repetitive connecting and disconnecting of a hydraulic jack. Finally, the self propelled internal pipe arching apparatus 14 of this invention provides for convenient pipe arching in the field, resulting in lowered shipping costs for those sizes of pipe which would not require a wide load designation prior to arching, but would require a wide load designation after arching.

The above description constitutes a preferred embodiment of the self propelled internal pipe arching machine of this invention, it is to be understood that the invention is not limited thereby and that in light of the present disclosure of the invention, various other alternative embodiments will be apparent to a person skilled in the art. Accordingly, it is to be understood that changes may be made without departing from the scope of the invention as particularly set forth and claimed.

I claim:

1. A self propelled pipe arching apparatus comprising,
   a self propelled unit for ground supporting an elongated beam along its length, said self propelled unit adapted to drive said beam into a pipe along its axis and locate said beam into a pipe arching position,
   internal pipe arching means mounted upon said beam and adapted to forcibly arch the pipe when said beam is in said arching position,
   said unit having means for transporting and controlling said pipe arching means;
   first wheeled drive means for supporting a first end of said base, and
   second wheeled means for supporting said beam at an end opposite said first end, thereby enabling said beam to be driven into said pipe.

2. The pipe arching apparatus as in claim 1 further comprising,
   said second wheeled means being mounted for pivotal movement about a vertical axis, and
   means for controlling the pivotal motion of said second wheeled means at said first wheeled driven means to enable said beam to be steered into said pipe.

3. The pipe arching apparatus as in claim 1 wherein said first wheeled driven means and said second wheeled means are each adapted to raise said beam into said arching position.

4. The pipe arching machine as in claim 3 further comprising lift control means to cooperatively raise said ends of said beam into said arching position, said lift control means being operatively controllable at said first wheeled driven means.

5. A self propelled pipe arching apparatus comprising,
   an elongated longitudinal beam having first and second ends,
   forming segments mounted to said beam and extendable in opposite directions in a substantially horizontal plane to forcibly arch the interior walls of a pipe suspended on said beam,
   a first wheeled driven means for providing ground support for said first end of said beam,
   a second wheeled means for providing ground support for said second end of said beam, said first and second wheeled means adapted to drivably extend said beam into the pipe prior to arching, lift said beam into a pipe arching position, arch said pipe, and drivably withdraw said beam from said pipe after arching.

6. The self propelled pipe arching apparatus as in claim 5 wherein said second wheeled means is connected to said second end of said beam for pivotal movement about a vertical axis, means for controlling said pivotal movement at said first wheeled driven means to enable said beam to be steered into said pipe.

* * * * *